3,405,135
PROCESS FOR PRODUCING N:N'-DISUBSTITUTED 4:4'-BIPYRIDYLIUM SALTS
John Edward Colchester and John Hubert Entwisle, Runcorn, England, assignors to Imperial Chemical Industries Limited, London, England, a corporation of Great Britain
No Drawing. Filed Apr. 5, 1965, Ser. No. 445,770
Claims priority, application Great Britain, Apr. 9, 1964, 14,720/64
14 Claims. (Cl. 260—295)

ABSTRACT OF THE DISCLOSURE

A process is disclosed for the production of an N,N'-disubstituted-4:4'-bipyridylium salt by treating an N,N'-disubstituted-tetrahydrobipyridyl with an oxidizing agent that is an organic compound which is a hydrogen acceptor and has a redox potential more positive than $-1.48$ volts. Typically the oxidizing agent is a quinone such as 1:4-benzoquinone.

---

This invention relates to the production of herbicidal compounds, and more particularly to the production of bis-quaternary salts of 4:4-bipyridyl.

It is known that bis-quaternary salts of 4:4'-bipyridyl are useful herbicides, and these compounds are usually made by a quaternisation reaction from 4:4'-bipyridyl. It is also known that N,N'-dibenzyl tetrahydrobipyridyl can be oxidised to produce N,N'-dibenzyl bipyridylium quaternary salts by treatment with iodine. This oxidation gives only poor yields of the quaternary salt however, and much of the starting material is converted into benzyl pyridinium salt (i.e. the two pyridine nuclei are broken apart in the reaction) or to form polymeric materials of uncertain composition. When this oxidation process is applied to the corresponding dialkyl (for example dimethyl) tetrahydrobipyridyl, however, it has been found that practically none of the bis-quaternary salt is formed and the product consists almost entirely of the pyridinium salt and polymer. We have now found that by selection of the oxidising agent, the undesirable splitting of the tetrahydrobipyridyl molecule can be reduced, yields of the bis-quaternary salt can be greatly improved, and the reaction can be made to provide a satisfactory preparative route for a variety of 4:4'-bipyridylium salts, particularly N,N'dialkyl-4:4'-bipyridylium salts.

Thus according to our invention we provide an improved process for the production of an N,N'-disubstituted-4:4'-bipyridylium salt which comprises treating an N,N'-disubstituted-tetrahydrobipyridyl with an oxidising agent that is an organic compound which is a hydrogen acceptor and has a redox potential more positive than $-1.48$ volts.

The oxidising agent used according to the process of our invention is advantageously a quinone, because of the very good yields of bipyridylium salt thereby obtained. The quinone is preferably 1:4-benzoquinone, though other quinones having the property of being readily reduced may also be used if desired. Thus in addition to 1:4-benzoquinone there may be mentioned tetrachloro-1:4-benzoquinone (chloranil), tetrachloro-1:2-benzoquinone, 2-methyl-1:4-benzoquinone, 1:4-naphthoquinone, 1:2-naphthoquinone, 2:3-dichloro-1:4-naphthoquinone and duroquinone.

Other oxidising agents which may be used include nitroalkanes, for example nitromethane, nitroethane and nitropropane; and readily reduced unsaturated carboxylic acids or their derivatives, for example maleic acid and maleic anhydride. When using a nitroalkane, the reaction may be assisted by the addition of a halogen, particularly iodine, even though the use of the halogen alone would not be satisfactory.

The reaction may be carried out conveniently in solution, usually in a solvent which will dissolve the N:N'-disubstituted tetrahydrobipyridyl and the oxidising agent. Suitable solvents include ethers, for example diethyl ether, tetrahydrofuran, 1:2-dimethoxy ethane, bis-(2-methoxyethyl) ether, and 1:4-dioxane; ketones, for example acetone; hydrocarbons, for example benzene and hexane; organic bases, for example pyridine; halogenated hydrocarbons, particularly chlorinated hydrocarbons, for example chlorobenzene, chloroform and trichloroethylene; amides, particularly tertiary alkylamides for example dimethyl formamide; and sulphoxides, for example dimethyl sulphoxide. Although their use tends to lead to somewhat lower yields of bis-quaternary salts than can be obtained with the above-mentioned solvents, the reaction may also be carried out in other solvents if desired, for example in alcohols (including glycols) for example ethylene glycol, diethylene glycol, methanol, 2-(2-methoxy ethoxy) ethanol, ethanol and isopropanol. Mixtures of such solvents may be used if desired.

The N:N'-disubstituted tetrahydro-4:4'bipyridyl may be in particular an N:N'-dialkyl-tetrahydro-4:4'-bipyridyl, in which case our selected oxidising agents are especially useful in giving good yields which are not obtainable with other oxidising agents. The N:N'-dialkyl tetrahydrobipyridyl may be made in known manner for example by reducing an aqueous solution of an N-alkyl pyridinium salt (for example N-methyl pyridinium iodide) with sodium amalgam or by electrolytic reduction. Alternatively it may be made by treatment of the sodium derivative of tetrahydrobipyridyl with an alkyl halide. The process may also be applied to tetrahydro-4:4-bipyridyls having a variety of other N-substituents, for example benzyl groups.

There may also be used, in particular, those tetrahydrobipyridyls having as N-substituents a carbamylalkyl group, especially an N:N-disubstituted carbamylmethyl group. Such compounds may be obtained by electrolytic reduction of the corresponding N-substituted pyridinium salt. The bipyridylium salts produced from these compounds are those described in our U.K. specifications Nos. 2210/62, 42,269/62 and 813,532, and may be made alternatively by reacting an N:N-disubstituted amide of a halogenated aliphatic monocarboxylic (especially an N:N-disubstituted chloroacetamide) with 4:4'-bipyridyl. The carbamylalkyl groups are of the structure —R,—CO—NR$_2$R$_3$ in which R, is a hydrocarbon radical (usually a methylene group —CH$_2$—) and R$_2$ and R$_3$ are hydrocarbon or substituted hydrocarbon radicals; the group R$_2$ and R$_3$ may, together with the attached nitrogen atom, form a heterocyclic ring (for example a piperidine or morpholine ring) which may optionally be substituted.

When using a quinone as oxidising agent, suitable proportions are usually approximately 2 moles for each mole of the di-substituted tetrahydrobipyridyl, though larger or smaller proportions may be used if desired. The mechanism of the reaction is complicated, since several different oxidation/reduction states can occur in both the quinone/quinol and the bipyridylium salt/tetrahydrobipyridyl systems. The overall reaction can be represented by the removal of two hydrogen atoms and two electrons from the di-substituted tetrahydrobipyridyl molecule. Similar considerations also apply when using other oxidising agents which take up two hydrogen atoms, for example maleic acid or anhydride. If the oxidising agent can take up more than two hydrogen atoms, the proportion may be varied accordingly. In the case of liquid nitroalkanes, an excess may usefully serve as solvent in the reaction.

The reaction may be carried out conveniently at ambient temperatures, though higher and lower temperatures may also be used if desired. The particular reaction conditions to be employed in any particular instance will, of course, depend to some extent upon the particular reactants and solvent employed.

After interaction of the N:N'-disubstituted tetrahydrobipyridyl and the oxidising agent, there is usually formed a product of indefinite composition which appears to correspond to that of an addition product and is highly coloured. This interaction product or the crude interaction mixture may be converted into the N:N'-disubstituted-4:4'-bipyridylium salt by treatment with an acid, particularly a mineral acid for example hydrochloric acid, sulphuric acid or phosphoric acid, though other acids may be used.

For this acid treatment, temperature is not a very critical factor and a variety of temperatures may be used. The acid treatment produces the bipyridylium salt and the reduced form of the oxidising agent for example produces the quinol from a quinone. The bipyridylium salt and the by-products of reduction of the oxidising agent can be recovered by conventional means. Thus for example the quinol can be separated from the quaternary salt by partition between water (which preferentially retains the salts) and a water immiscible solvent such as ether (which preferentially dissolves the quinol).

The process of our invention has the advantages of providing very useful yields of bis-quaternary salts, as high as 55% or more of theory. It also has the advantage that it enables different salts to be prepared at will by use of the appropriate acid in the final stage; this provides a simple route to salts which are less corrosive than the chlorides which are usually the most accessible ones by the processes formerly available.

The invention is illustrated but not limited by the following example in which the parts and percentages are by weight unless otherwise stated.

Example 1

A solution of 1:4-benzoquinone (18.4 g., 0.16 mole) in diethyl ether (400 ml.) was added in a steady stream to a solution of N,N'-dimethyl tetrahydro-4:4'-bipyridyl (16 g. 0.085 mole) in diethyl ether (200 ml.). The addition was carried out in the substantial absence of air. A bright blue coloured solid separated from the mixture and the ether was then removed by distillation. The residue was dissolved in methanol (600 ml.) and to this solution was added an alcoholic 10% solution of hydrochloric acid (280 ml.). A deep red solid was thus formed, which was collected and dissolved in water. The resulting dark red solution, which contained methanol and ether, was tested colourimetrically for the N:N'-dimethyl-4:4'-bipyridylium ion, and the yield of this was estimated on this basis as 40% of theory.

By evaporation of the red solution to low bulk, a deep red crystalline solid was isolated, which was found to be identical with the addition compound formed from equimolecular proportions of quinol and N:N'-dimethyl-4:4'-bipyridylium dichloride.

A portion of the deep red aqueous solution was extracted continuously with three times its volume of diethyl ether for 3 hours, and then the ether extract was separated, dried, and evaporated to dryness. The residue from the ether layer consisted of quinol (8.9 g. for each 100 ml. of the red solution taken). The aqueous layer was evaporated to very small bulk and left to crystallize, whereby there was obtained N:N'-dimethyl-4:4'-bipyridylium dichloride (4.5 g. for each 100 ml. of the red solution taken).

Example 2

A solution of 1:4-benzoquinone (18.4 g., 0.17 mole) in bis-(2-methoxyethyl) ether (250 ml.) was added dropwise to a rapidly stirred solution of N:N'-dimethyl tetrahydro 4:4-bipyridyl (16 g., 0.085 mole) in bis-(2-methoxy ethyl) ether (150 ml.). The addition was made at 0° C. over a period of 50 minutes, and care was taken to exclude moisture and air. The reaction was found to be conveniently carried out in a Büchi rotary evaporator. A bright violet-blue solid separated immediately the quinone was added.

When addition was complete, an aqueous solution of hydrochloric acid (26 g. of the 35% acid diluted with 200 ml. water) was added gradually. Gas evolution occurred and the blue mixture changed to a red solution. This solution was analysed for the N:N'-dimethyl-4:4'-bipyridylium ion, polarographically and colorimetrically by sodium dithionite reduction.

The formation of N:N'-dimethyl-4:4'-bipyridylium dichloride was found to be approximately 75–80% of theory. This salt was isolated by taking the red acidic solution (650 ml.), evaporating it to low bulk (100 ml.), and then extracting it several times with diethyl ether (250 ml.). The ether phase was dried and evaporated to dryness, whereby hydroquinone was recovered (100% of theory, M.P. 172° C.). The aqueous phase was mixed with ethanol (50 ml.) and allowed to stand; N:N'-dimethyl-4:4'-dipyridylium dichloride (16.3 g.) crystallised out and was collected by filtration.

Example 3

The procedure of Example 2 was repeated using different quinones in place of 1:4-benzoquinone. The results obtained are summarized in the table given below.

| Quinone | Solvent | Percent yield of dichloride |
|---|---|---|
| 1:4-benzoquinone | Bis-(2-methoxy-ethyl) ether | 80 |
| Monochloro-1,4-benzoquinone | do | 55 |
| Dichloro-1,4-benzoquinone | do | 36 |
| Trichloro-1,4-benzoquinone | do | 20 |
| Tetrachloro-1,4-benzoquinone | do | 16 |
| Tetrachloro-1,2-benzoquinone | do | 44 |
| 2-methyl-1,4-benzoquinone | do | 42 |
| 1,4-naphthoquinone | do | 56 |
| 1,2-naphthoquinone | do | 69 |
| 2,3-dichloro-1,4-naphthoquinone | Tetrahydrofuran | 61 |
| 9,10-anthraquinone | Diethyl ether/bis-(2-methoxy-ethyl) ether | 15 |

In each case molar ratio of quinone to tetrahydro derivative was 2:1 and the volume of solvent was 400 ml.

The dichloride referred to in the last column of the tables is N:N'-dimethyl-4:4'-bipyridylium dichloride.

Example 4

The procedure of Example 2 was repeated using variations of the solvent and reaction conditions. The results are summarized in the table given as follows:

| Molar ratio of p-benzoquinone to the tetrahydro derivative | Temperature of reaction (° C.) | Reaction time (mins.) | Solvent (400 ml.) | Percent yield of dichloride |
|---|---|---|---|---|
| 2:1 | 25 | 10 | Bis-(2-methoxy ethyl) ether. | 50 |
| 2:1 | 0 | 50 | ....do.... | 80 |
| 2:1 | −40 | 50 | ....do.... | 71 |
| 2:1 | +50 | 10 | ....do.... | 40 |
| 1.5:1 | 0 | 50 | ....do.... | 47 |
| 1:1 | 0 | 50 | ....do.... | 31 |
| 3:1 | 0 | 50 | ....do.... | 75 |
| 2:1 | 0 | 50 | ....do.... | 22 |
| REVERSE ADDITION | | | | |
| 2:1 | 0 | 40 | Diethyl ether | 70 |
| 2:1 | 20 | 5 | ....do.... | 40 |
| 2:1 | 0 | 40 | Tetrahydrofuran | 66 |
| 2:1 | 0 | 40 | Dimethoxyethane | 55 |
| 2:1 | 0 | 40 | Dioxane | 65 |
| 2:1 | 5 | 40 | Benzene | 52 |
| 2:1 | 0 | 40 | Hexane | 63 |
| 2:1 | 0 | 40 | Pyridine | 54 |
| 2:1 | 0 | 40 | Acetone | 59 |
| 2:1 | 0 | 40 | Dimethylformamide | 56 |
| 1.5:1 | 0 | 40 | Chlorobenzene | 43 |
| 2:1 | 0 | 40 | ....do.... | 59 |
| 2:1 | 0 | 30 | Chloroform | 39 |
| 2:1 | 0 | 40 | Trichloroethylene | 49 |
| 2:1 | 5 | 40 | Dimethylsulphoxide | 22 |
| 2:1 | 0 | 40 | Ethylene glycol | 7 |
| 1.5:1 | 0 | 40 | ....do.... | 5 |
| 2:1 | 0 | 40 | Diethylene glycol | 9 |
| 2:1 | 0 | 40 | Methanol | 7 |
| 2:1 | 0 | 30 | Ethanol | 7 |
| 1.5:1 | 0 | 30 | ....do.... | 2 |
| 1:1 | 0 | 30 | ....do.... | 2 |
| 2:1 | 0 | 30 | Isopropanol | 7 |

Example 5

The procedure of Example 2 was repeated using tetrahydrofuran in place of the bis-(2-methoxyethyl) ether, and using N:N'-bis(diethylcarbamylmethyl) tetrahydro-4:4'-bipyridyl (19.3 g.) in place of the dimethyl tetrahydrobipyridyl. The N:N'-bis(diethylcarbamylmethyl)-4:4'-bipyridylium dichloride thus formed was estimated by colourmetric analysis using sodium dithionite. The yield was 17.5% of theory. This bipyridylium salt is the same as that made by interaction of 4:4'-bipyridyl and N:N-diethyl chloroacetamide.

Example 6

The procedure of Example 2 was repeated using chloroform as solvent and using N:N-bis-(piperidinocarbonyl-methyl)-tetrahydro-4:4'-bipyridyl (23.5 parts) in place of the dimethyl tetrahydrobipyridyl. The yield of the corresponding bipyridylium salt was found to be 8% of theory.

This bipyridylium salt is the same as that made by interaction of 4:4'-bipyridyl with N-chloroacetylpiperidine.

Example 7

The procedure of Example 2 was repeated using benzene as solvent and using N:N'-bis-(3:5-dimethyl-morpholinocarbonyl methyl)-tetrahydro - 4:4' - bipyridyl (20.5 g.) in place of the dimethyltetrahydrobipyridyl. The yield of the corresponding bipyridylium salt was found to be 12% of theory. This bipyridylium salt is the same as that made by interaction of 4:4'-bipyridyl with N-chloroacetyl-3:5-dimethylmorpholine.

Example 8

N:N'-dimethyltetrahydrobipyridyl (16 parts) was dissolved in diethyl ether (70 parts) at 35° C. and a solution of maleic anhydride (16.5 parts) in diethyl ether (245 parts) was added during 30 minutes, followed by aqueous hydrochloric acid (200 parts, 1.1 N). The aqueous solution thus obtained was analysed colourimetrically by the sodium dithionite reduction method, and the yield of N:N'-dimethyl-4:4'-bipyridylium salt was found to be 30% of theory.

Example 9

N:N-dibenzyltetrahydrobipyridyl (34 g.) was dissolved in 2-nitropropane (150 ml.) and warmed to 60° C. for 1 hour. Chloroform (100 ml.) was then added, followed by a saturated solution of iodine in chloroform which was slowly added until the reaction mixture developed a deep red colour. Red crystals of N:N'-dibenzyl-4,4'-bipyridylium di-iodide settled out of the solution and were collected by filtration. The yield was 25% of theory.

This procedure was repeated using N:N'-dimethyltetrahydrobipyridyl (18.8 g.) in place of the benzyl derivative. The N:N'-dimethyl-4:4'-bipyridylium di-iodide formed was extracted with water and estimated colourimetrically using sodium dithionite. The yield was approximately 8% of theory.

What we claim is:

1. Process for the production of an N:N'-disubstituted-4:4'-bipyridylium salt which comprises treating an N:N'-disubstituted tetrahydro-4:4'-bipyridyl with an oxidizing agent that is an organic compound which is a hydrogen acceptor and has a redox potential more positive than −1.48 volts, said treatment being carried out in the presence of an inert organic solvent medium in which the N:N'-disubstituted tetrahydro-4:4'-bipyridyl and oxidizing agent are both dissolved.

2. Process for the production of an N:N'-disubstituted-4:4'-bipyridylium salt which comprises treating an N:N'-disubstituted tetrahydro-4:4'-bipyridyl with an oxidizing agent that is an organic compound which is a hydrogen acceptor and has a redox potential more positive than −1.48 volts, said agent being a quinone.

3. Process as claimed in claim 2 wherein the treatment is carried out in an organic solvent for the N:N'-disubstituted tetrahydrobipyridyl and the oxidising agent.

4. Process as claimed in claim 3 wherein the solvent is an ether.

5. Process as claimed in claim 2 wherein the N:N'-disubstituted tetrahydrobipyridyl is an N:N'-dialkyl-tetrahydro-4:4'-bipyridyl wherein the alkyl are lower alkyl.

6. Process as claimed in claim 2 wherein the N:N'-disubstituted tetrahydrobipyridyl has an N-substituent a carbamyl alkyl group wherein the alkyl are lower alkyl.

7. Process as claimed in claim 6 wherein the carbamyl alkyl group is an N:N'-disubstituted carbamylmethyl group.

8. Process as claimed in claim 2 wherein the proportion of the oxidising agent used is approximately 2 moles for each mole of the tetrahydrobipyridyl deriavtive.

9. Process as claimed in claim 2 wherein the product of interaction of the oxidising agent and the N:N'-disubstituted tetrahydrobipyridyl is treated with an acid.

10. Process as claimed in claim 9 wherein the acid used is a mineral acid.

11. Process as claimed in claim 10 wherein the acid is sulphuric, hydrochloric or phosphoric acid.

12. Process as claimed in claim 2 wherein the quinone is 1:4-benzoquinone.

13. Process as claimed in claim 1 wherein the oxidising agent is a nitroalkane.

14. Process as claimed in claim 1 wherein the oxidising agent is maleic acid or maleic anhydride.

No references cited.

HENRY R. JILES, *Primary Examiner.*

A. L. ROTMAN, *Assistant Examiner.*